May 14, 1968 — D. E. WILCOX — 3,382,724

THREE AXIS ACCELEROMETER

Filed Jan. 4, 1965 — 3 Sheets-Sheet 1

INVENTOR.
DOYLE E. WILCOX

BY *Vincent N. Cleary*

ATTORNEY

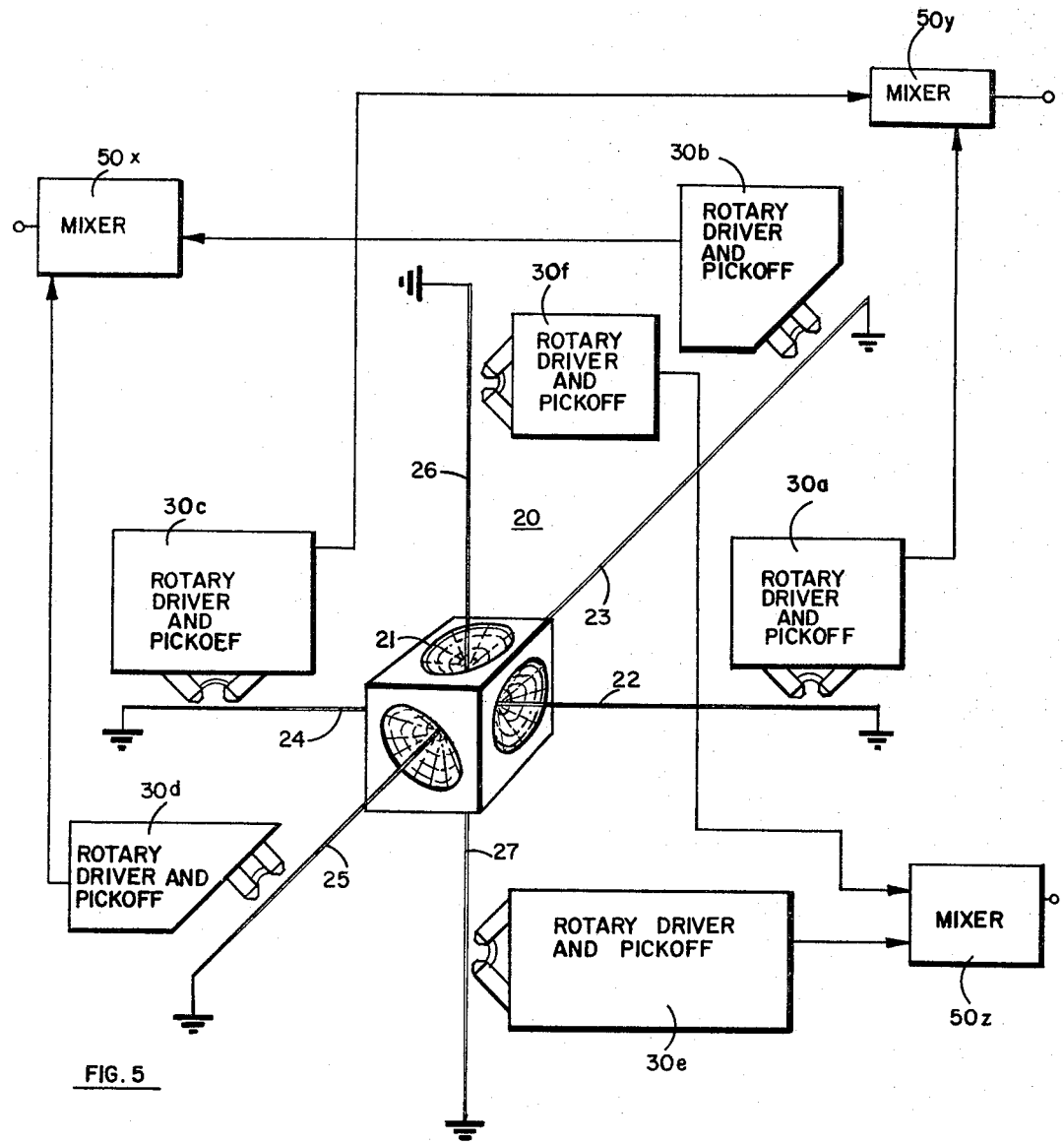
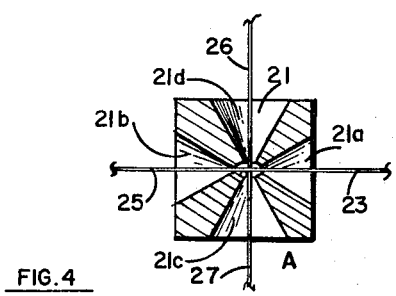
FIG. 5
FIG. 4
INVENTOR.
DOYLE E. WILCOX
BY
*Vincent N Cleary*
ATTORNEY

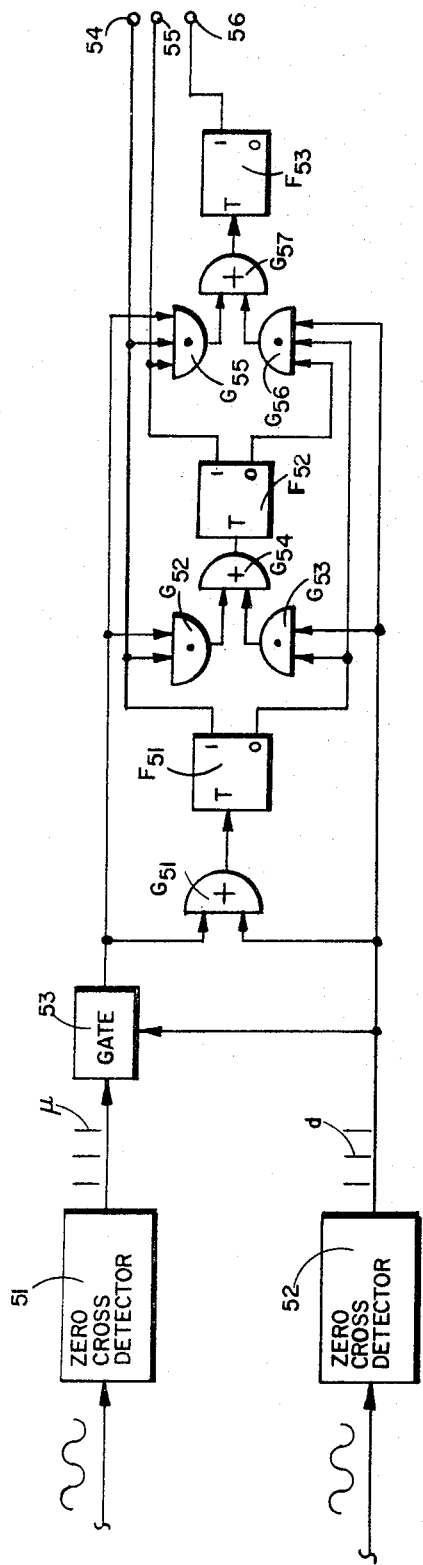

United States Patent Office 3,382,724
Patented May 14, 1968

3,382,724
THREE AXIS ACCELEROMETER
Doyle E. Wilcox, Hacienda Heights, Calif., assignor, by mesne assignments, to North American Rockwell Corporation, a corporation of Delaware
Filed Jan. 4, 1965, Ser. No. 422,962
5 Claims. (Cl. 73—517)

ABSTRACT OF THE DISCLOSURE

A vibratory string type accelerometer for determining acceleration along three mutually orthogonal axes. A proof mass is suspended by six string members extending from the proof mass along the three axes. The string members are whirled in a circular orbit, the frequency of which will vary as a function of acceleration.

---

This invention relates to an apparatus for measuring acceleration and more specifically to a vibratory string or wire type accelerometer.

In prior art vibratory string type accelerometers, a proof mass or inertial mass is suspended by two vibratory string members for suspension along a predetermined axis. These string members or wire members are vibrated in a plane so that in the presence of acceleration, the frequency of vibration of the string members will vary as a function of the acceleration. Since the string members are vibrating in a plane, the string members will effect longitudinal forces at either end along the mounting axis. As a result of this, there are coupling forces between one string member and the other through the proof mass which is detrimental to the accuracy of the accelerometer.

A feature of the present invention is a vibratory string type accelerometer which has a proof mass or inertial mass that is mounted or suspended along a predetermined axis by two vibratory string members extending from opposite sides of the proof mass. These string members are supported at their ends by a casing. In the present invention, the vibratory string members are not vibrated in a plane but are whirled in a circular orbit. In the presence of an acceleration, the frequency of the whirling will vary and this provides an indication of the acceleration. By whirling the string members rather than vibrating them in a plane, the effective length of the string member remains constant so that the vibratory forces of the string members along the mounting axis are relatively constant; and hence, cross-coupling of forces between one vibratory string member and the other is minimized.

Therefore, an object of the invention is to provide a new and improved accelerometer or velocity meter.

A further object of the invention is the provision of a vibratory string type accelerometer that can measure acceleration of velocity with a relatively high degree of accuracy.

A still further object of the invention is to provide a vibratory string type accelerometer in which there is a minimum of cross-coupling of forces between vibratory string members due to the vibration thereof.

A still further object of the invention is the provision of a new and improved three-axis accelerometer utilizing a single proof mass.

Other objects and advantages of the present invention will become more apparent with the reading of the following specification taken in conjunction with the drawings in which:

FIG. 4 illustrates a cross-section view of the proof mass utilized in the embodiment shown in FIG. 1;

FIG. 5 illustrates a schematic diagram partially in block form of the embodiment illustrated in FIG. 1; and FIG. 6 illustrates a schematic diagram in block form of a circuit suitable for use with the accelerometer of FIG. 5.

Figure 1:
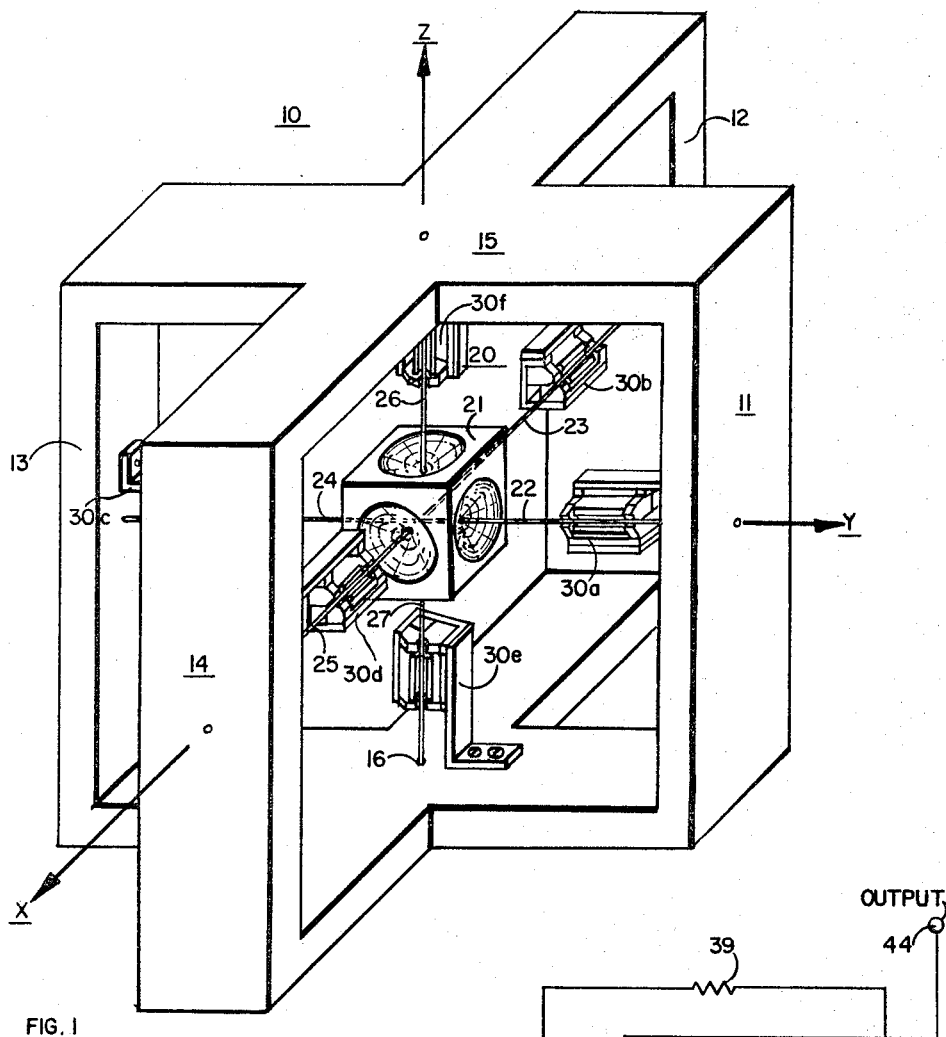
FIG. 1 illustrates an accelerometer embodying the invention.

Generally, the embodiment illustrated in FIG. 1 includes a casing 10 within which a proof mass 21 is suspended by a plurality of vibratory strings on the mutually orthogonal X, Y, and Z axes. The proof mass is suspended by two vibratory string members on each of these axes. Each string member is whirled about its respective axis by a rotary driver and pickoff which operates to rotate each string member in a whirling motion and also reads out the frequency of rotation which will vary as a function of the acceleration on the proof mass along the respective axes.

More specifically, the casing 10 includes an upper horizontally disposed cross member 15 and a lower horizontally disposed cross member 16. Extending between members 15 and 16 are vertically disposed side walls 11, 12, 13 and 14. Located within and mounted on the casing 10 is a proof mass and suspension system 20 including a cubical proof mass 21 which is centrally located within casing 10. Centrally located on each side of cubical proof mass 21 are conically shaped recesses. Four of these recesses 21a, 21b, 21c and 21d are shown in FIG. 4. These recesses are for receiving vibratory type string members shown as members 22, 23, 24, 25, 26 and 27. In the preferred embodiment, these string members are made of a ferromagnetic material such as high carbon steel.

As shown in FIG. 4, the embodiment in FIG. 1 utilizes three vibratory strings of equal length which are secured at their centers to each other and to center of proof mass 21. More specifically as shown in FIG. 4 and FIG. 1, proof mass 21 is supported on the X axis by an X vibratory string member secured at one side to vertical column 12 and at the other side to vertical column 14. A first string portion 23 of this X string member is secured to and extends from column 12, passes through conical recess 21a and at its center, as shown in FIG. 4, is secured to the center of a Z vibratory string member. The second portion 25 of the X string member extends outwardly from proof mass 21 through conical recess 21b and is secured at its outer end to column 14 of housing 10.

Proof mass 21 is supported along the Z axis by a Z string member having an upper string portion 26 and a lower string portion 27. The upper end of string portion 26 is secured to horizontal cross member 15 of housing 10. Lower end of string portion 27 is secured to lower horizontal member 16 of housing 10. These two portions 26 and 27 define the center of the Z string where the Z string is secured to the center of the vibratory Y string and the vibratory X string. This common connection is secured to the center of proof mass 21.

Proof mass 21 is supported along the Y axis by a vibratory Y string having a portion 22 and a portion 24. These portions define the center of the Y string which center is secured to the center of the X and Z vibratory strings. The outer end of portion 22 secured to column 11 and the outer end of portion 24 is secured to vertical column 13. Thus, proof mass 21 is suspended at its center by string portions 22 and 24 along the Y axis, string portions 23 and 25 along the X axis, and string portions 26 and 27 along the Z axis. Preferably, the string portions 22 through 27 are all of equal length, the same material, and the same circular cross-section dimensions.

Each one of string portions 22 through 27 is rotated in a whirling motion by a rotary driver and pickoff means.

Figure 2:
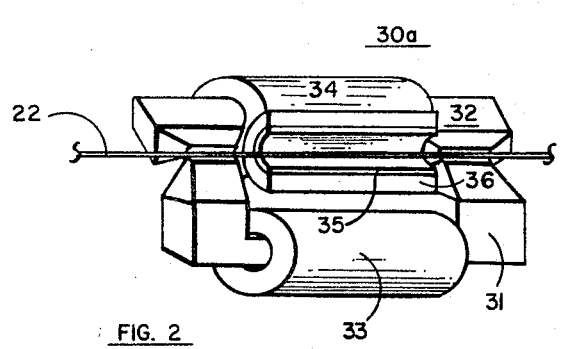
FIG. 2 illustrates an enlarged view of a rotary driver and pickoff means utilized in the embodiment of FIG. 1.
Figure 3:
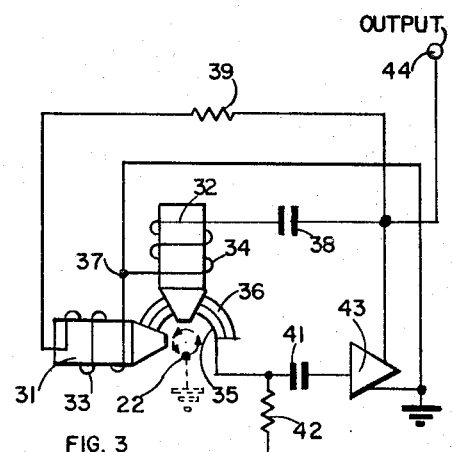
FIG. 3 illustrates a schematic diagram of a circuit employed with the driver and pickoff means illustrated in FIG. 2.

More specifically, string portion 22 is rotated by a rotary driver and pickoff 30a illustrated in FIGS. 2 and 3 and in FIG 5. The rotary driver and pickoff 30a will be described in detail below. String portion 23 is rotated by rotary driver and pickoff 30b that is mounted on vertical column 12. String portion 24 is rotated by a rotary driver and pickoff means 30c which is mounted on column 13. String portion 25 is rotated by rotary driver and pickoff means 30d which is mounted in column 14. String portion 26 is rotated by rotary driver and pickoff means 30f which is mounted on horizontal section 15 of housing 10. String portion 27 is rotated by a rotary driver and pickoff 30e that is mounted on lower horizontal section 16 of housing 10.

Since all the rotary driver and pickoff means 30a through 30f have the same circuitry and physical configuration, the details of only one of these rotary drivers and pickoffs (30a) will be described in detail. Preferably, the driver and pickoff means 30a through 30f are positioned midway the ends of the corresponding string portion.

The physical configuration of the rotary driver 30a as shown in FIG. 2 includes a first U-shaped electromagnet including a U-shaped pole piece 31 and a second U-shaped electromagnet having a U-shaped pole piece 32. As shown in FIGS. 2 and 3, pole pieces 31 and 32 are orthogonally disposed with respect to each other and the wire portion 22 so as to produce orthogonally disposed magnetic fields. Pole piece 31 has an armature 33 wound about its central portion and pole piece 32 has an armature 34 wound about its central portion.

FIG. 3 is a block diagram of a typical circuit which with the above described electromagnets will drive the accelerometer strings or wires in a rotary whirling mode. String 22 is shown in cross section in the plane of the electromagnetic driver, with its whirl trajectory indicated by the circular arrow path. String 22 is electrically grounded as shown in dotted lines. Capacitance pickoff plate 35 may be either a flat or semicylindrical-sector metal plate (as shown in FIGS. 2 and 3), and is held by insulated mountings in close proximity to the trajectory of the whirling string. Plate 35 is charged to a polarizing potential $E_p$ by connection through a high resistance 42. The electrical charge existing in the capacitance between string 22 and plate 35 will remain nearly constant throughout one whirl cycle of string 22. The magnitude of the capacitance between string 22 and plate 35 will be modulated (in an approximately sinusoidal manner) by the variation in spacing between these members throughout one whirl revolution.

Since the string is connected to circuit ground, the potential of plate 35 will vary (sinusoidally) about the mean potential $E_p$ being a maximum when the spacing is at a maximum, and minimum when the string 22 is closest to plate 35. The combination of string 22, capacitance plate 35, resistor 42 and polarizing potential $E_p$ results in an electrical pickoff signal being impressed on the input of an amplifier 43 through a coupling capacitor 41. This electrical signal is a single phase measure of the instantaneous spacing between string 22 and fixed plate 35. This signal is amplified by amplifier 43 and the output current of amplifier 43 is split into two-phase component currents by means of a resistor 39 and a capacitor 38. The in-phase component passing through resistor 39 excites the string drive armature 33, and the quadrature component passing through capacitor 38 excites the drive armature 34. The electromagnetic drive armatures 33 and 34 are spaced orthogonally with respect to each other and the axis of string 22. These armatures have a constant magnetic bias produced by means of a semi-cylindrical permanent magnet 36 in their magnetic circuit. Hence, the split-phase excitation of these armatures will impose a rotating force vector on string 22, causing string 22 to whirl about its axis, as shown.

Amplifier 43 has essentially zero phase shift over its operating frequency range, and the gain is automatically variable in such a manner that the amplitude of the whirl of string 22 is quite small, on the order of four or five times the string diameter.

It is understood that completely independent electrical drive circuits of the type described are used to drive each string in the accelerometer.

The output at output terminal 44 and the forcing current through armatures 33 and 34 in the embodiment illustrated in FIGS. 1–3 will not be perfectly sinusoidal although the shape of the pickoff plate 35 could be made flat so as to provide a sinusoidal output to provide the whirling motion shown in FIG. 3. However, it is not necessary that this forcing current be sinusoidal since the relatively high Q property of the string will result in a circular whirling path even though the forcing current is not sinusoidal.

Preferably, the two respective portions 22 and 24 are rotated in opposite directions between respective drivers 30a and 30c. Likewise, the portions 23 and 25 will rotate in opposite directions in the whirling mode and also portions 26 and 27 are rotated in opposite directions by their respective drivers. By so doing, any cross-coupling between string portions is even further minimized.

The driver 30a shown in FIG. 3 illustrates string portion 22 rotating in a counter clockwise direction. In order to produce opposite rotation of the string 24, the driver 30c would be as shown in FIG. 3 except capacitor 38 and resistor 39 would be interchanged. Opposite rotation could also be achieved by interchanging the position of pole piece 32 and armature 34 with pole piece 31 and armature 33 in the circuit shown in FIG. 3.

These variations are also employed to produce opposite rotation of the string portions 23 and 25 and of string portions 26 and 27.

When there is acceleration applied to proof mass 21 on the Y axis, the proof mass 21 will tend to move along this axis in the direction of acceleration so as to tend to lengthen the distance between the ends of one string portion and shorten the distance between the ends of the other string portion. As a result, the frequency of vibration of the lengthened portion will increase while the frequency of the other string portion will decrease. In order to obviate the necessity of a reference frequency, the acceleration is measured as a difference of these two frequencies. Thus, the output of the rotary driver and pickoff units 30a and 30c are both applied to a mixer 50y having an output which is a measure of the acceleration applied to proof mass 21 on the Y axis. Further, the phase of this signal provides the information as to the direction of the acceleration along the Y axis.

Similarly, the output of rotary driver and pickoff 30b and rotary driver and pickoff 30d are applied to a mixer 50x. The output in mixer 50x varies as the difference in frequency between vibratory strings 23 and 25. Thus, the output of mixer 50x provides information as to the acceleration applied to proof mass 21 along the X axis and the phase of the output of mixer 50x provides information as to the direction of the acceleration.

The outputs of rotary driver and pickoffs 30e and 30f are applied to mixer 50z which has an output that is a measure of the difference in frequency of string portions 26 and 27 which varies as the acceleration on the proof mass 21 along the Z axis. Likewise, the phase of the output of mixer 50z defines the direction of the acceleration along the Z axis.

As stated above, the outer ends of all the vibratory strings are secured to casing 10. As such the difference in frequency of vibration of the two string portions along an axis provides the information from which the acceleration along this axis can be calculated.

It can be shown that the difference in frequency of vibration $(f_1 - f_2)$ of two string portions on an axis equals $K_1 A + K_2 A^3 + K_3 A^5 \ldots$ where $A$ is the acceleration and $K_1$, $K_2$ and $K_3$ are constants. The constants are dependent on the mass of the proof mass and the strings, the length of the strings and the original tension of the strings. The system can be constructed so that only the first term $K_1A$ is significant and only this term need be used to calculate acceleration. In such a case, $$\text{acceleration} = \frac{f_1 - f_2}{K_1}$$

Normally, the third term $K_3A^5$ is so small as to be disregarded. If the second term ($K_2A^3$) is large enough to be considered, its non-linear effect could be calibrated or otherwise included in the calculations.

FIG. 6 illustrates a mixer suitable to perform the function required of mixers $50x$, $50y$, and $50z$. Since all these mixers are identical, it is only necessary to describe one mixer as illustrated in FIG. 6. The two input signals from the two rotary driver and pickoff means are fed respectively to two zero-cross detectors 51 and 52. These zero-cross detectors provide a pulse each time the alternating current signal passes through zero so that a pulse will be provided at their outputs for every half cycle of the signal. Suitable operation could be obtained by having a pulse output produced only every full cycle. The remainder of the circuit is commonly known as an up and down counter. Zero-cross detector 51 produces up-count pulses shown as $\mu$ in FIG. 6; whereas, zero-cross detector 52 provides down-count pulses illustrated as $d$ in FIG. 6. Gates $G_{51}$, $G_{54}$, $G_{57}$, are OR gates whereas $G_{52}$, $G_{53}$, $G_{55}$ and $G_{56}$ are AND gates. $F_{51}$, $F_{52}$, and $F_{53}$ are simple T flip-flops which change state any time there is a pulse present at the input. These flip-flops have a delay in changing states which is slightly longer than the time width of pulses $\mu$ and $d$. Flip-flop $F_{53}$ provides the most significant bit while flip-flop $F_{51}$ provides the least significant bit. Gate 53 is a gate employed so that down-count pulses $d$ will come into the counter before any up-count pulses $\mu$ do. When the first down-count pulse $d$ arrives at the output of zero-cross detector 52, it opens gate 53 after a very small delay so as to pass the next up-count pulse $\mu$. Gate 53 then remains open during the entire operation and is not affected by subsequent down-count pulses $d$ being applied thereto. It will be understood that normally the register will have considerably more bits but only three bits are employed in this illustration, by way of example.

Initially, in order to provide polarity information, the flip-flops $F_{51}$, $F_{52}$, and $F_{53}$ are all set in a false condition, i.e., with their upper outputs having zeros and lower outputs having one's as shown in FIG. 6. The device is turned on under no acceleration condition. When the first down-count pulses $d$ arrive, the three flip-flops will all be switched to true conditions. An up-count pulse $\mu$ will be the next pulse to arrive so that the three flip-flops will return to a false condition. If two up-count pulses occur without an intervening down-count pulse, $F_{51}$ will be true where $F_{52}$ and $F_{53}$ will be false. The next down-count pulse will then turn the register to all true. So long as the up-count pulses and down-count pulses are equal in number, the register at outputs 54, 55 and 56 will read 000 and 111 so as to indicate an equal number of up and down count pulses and therefore no acceleration. If there are more up-count pulses than down-count pulses occurring, the most significant bit $F_{53}$ will be false and the other flip-flops will indicate the excessive count. Thus, utilizing a register with a significant number of bits, the most significant bit, $F_{53}$ in FIG. 6, will only be switched from 000 when the register is going from all 111's to all 000's or vice versa. Consequently, the most significant bit of the register will indicate the direction of the velocity or acceleration whereas the remaining bits will be a measure of the velocity of proof mass 21. More specifically, outputs 54, 55 will provide a binary indication of the velocity and output 56 will provide the direction information of the acceleration or velocity. Normally, many more flip-flops and corresponding outputs would be utilized to cover a large acceleration range.

Table 1 below illustrates the condition of the counter for various changes of frequency in either direction.

TABLE 1

|  | $F_{51}$ | $F_{52}$ | $F_{53}$ |  |
|---|---|---|---|---|
|  | 1 | 0 | 1 | more down |
|  | 0 | 1 | 1 | count |
|  | 1 | 1 | 1 | pulses |
| START | 0 | 0 | 0 | more up |
|  | 1 | 0 | 0 | count |
|  | 0 | 1 | 0 | pulses |

The register or counter $F_{51}$, $F_{52}$ and $F_{53}$) provides a binary indication of the velocity of the proof mass. If this indication is divided by time, the acceleration can be calculated. Normally, this calculation is not necessary. Thus, the velocity on each axis X, Y and Z is measured by mixers $50x$, $50y$ and $50z$.

It will be understood that the invention may embody various forms other than those illustrated and described herein and that other modifications may be made and details thereof without departing from the spirit and scope of the invention.

I claim:

1. An accelerometer comprising an inertial mass, support means, a string member operatively connected at opposite ends thereof between said inertial mass and said support means, means for whirling said string in a substantially circular orbit about an axis defined by said opposite ends, whereby said inertial mass is sensitive to acceleration along said axis to change the frequency of rotation of said string, and means sensing the frequency of rotation of said string.

2. An accelerometer comprising an inertial mass, support means, a string member including a first vibratory string portion operatively connected at opposite ends thereof between one side of said inertial mass and said support means and a second string portion operatively connected at opposite ends thereof between said support means and on opposite sides of said inertial mass, means for whirling said first string portion in a substantially circular orbit about a first axis defined by its opposite ends, means on on opposite sides of said inertial mass, means tially circular orbit about a second axis defined by its opposite ends, said first and second axes being substantially parallel whereby said inertial mass is sensitive to acceleration along said first and second axes to change the frequency of rotation of said first and second string portions, and means for sensing the difference in frequencies of rotation of said first and second string portions in response to acceleration on said inertial mass.

3. An accelerometer comprising an inertial mass, support means, a plurality of string members operatively connected at opposite ends thereof between said inertial mass and different portions of said support means, means for individually whirling said string portions in substantially circular orbits about a plurality of axes defined by the opposite ends of each of said string portions whereby said inertial mass is sensitive to acceleration along each of said axes to change the frequency of rotation of the string portion secured along that axis, and means for individually sensing the frequency of rotation of said string portions.

4. An accelerometer comprising an inertial mass, support means, first and second string members connected at one of the ends thereof to opposite sides of said inertial mass, the other ends of said first and second string members being connected to opposite sides of said support means whereby said first and second string members are colinear and define a first axis, third and fourth string members connected at one of the ends thereof to opposite sides of said inertial mass, the other ends of said third and fourth string members being connected to opposite sides of said support means whereby said third and fourth string members are colinear and define a second axis, said second axis being substantially perpendicular to said first axis, fifth and sixth string members connected at one of the ends thereof to opposite sides of said inertial mass, the other ends of said fifth and sixth string members being connected to opposite sides of said support means whereby said fifth and sixth string members are colinear and define a third axis, said third axis being substantially perpendicular to said first and second axes, means for separately whirling each of said string members in a substantially circular orbit about its respective axis, said inertial mass being sensitive to acceleration along each of said first, second and third axes to change the frequency of rotation of the string members along the axis subject to acceleration, and means for separately sensing the frequency of rotation of each of said string members.

5. The accelerometer of claim 4 further comprising means for sensing the difference in frequencies of rotation between said first and said second string members, means for sensing the difference in frequencies of rotation between said third and fourth string members, and means for sensing the difference in frequencies of rotation between said fifth and sixth string members so as to derive an indication of acceleration along said first, second and third axes.

References Cited

UNITED STATES PATENTS

| | | | |
|---|---|---|---|
| 2,319,940 | 5/1943 | Marrison | 73—382 |
| 3,101,001 | 8/1963 | Appleton | 73—517 X |
| 3,181,373 | 5/1965 | Voutsas | 73—517 |
| 3,190,121 | 6/1965 | Blasingame | 73—517 X |

JAMES J. GILL, *Primary Examiner.*

UNITED STATES PATENT OFFICE
CERTIFICATE OF CORRECTION

Patent No. 3,382,724

May 14, 1968

Doyle E. Wilcox

It is certified that error appears in the above identified patent and that said Letters Patent are hereby corrected as shown below:

Column 6, line 41, "means on on opposite sides of said inertial mass, means" should read -- means for whirling said second string portion in a substan- --.

Signed and sealed this 9th day of December 1969.

(SEAL)
Attest:

Edward M. Fletcher, Jr.
Attesting Officer

WILLIAM E. SCHUYLER, JR.
Commissioner of Patents